(12) United States Patent
Kanjo

(10) Patent No.: US 6,414,259 B2
(45) Date of Patent: Jul. 2, 2002

(54) INTER-WELDING ELECTRODE MOVING AMOUNT DETECTING METHOD AND APPARATUS THEREOF

(75) Inventor: Mitsunori Kanjo, Kanagawa-ken (JP)

(73) Assignee: Nissan Motor Co., Ltd., Kanagawa-Ken (JP)

(*) Notice: Subject to any disclaimer, the term of this patent is extended or adjusted under 35 U.S.C. 154(b) by 0 days.

(21) Appl. No.: 09/765,730

(22) Filed: Jan. 19, 2001

(30) Foreign Application Priority Data

Jan. 20, 2000 (JP) ...................................... 2000-012202
Jan. 15, 2001 (JP) ...................................... 2001-005840

(51) Int. Cl.$^7$ ............................................... B23K 11/25
(52) U.S. Cl. ........................ 219/91.2; 219/109; 219/110
(58) Field of Search ................................ 219/109, 110, 219/91.2

(56) References Cited

U.S. PATENT DOCUMENTS

| | | | |
|---|---|---|---|
| 4,441,006 A | * | 4/1984 | Machida et al. |
| 4,861,960 A | * | 8/1989 | Haefner et al. |
| 5,194,709 A | * | 3/1993 | Ichikawa et al. |
| 5,558,785 A | * | 9/1996 | Killian et al. |
| 5,587,091 A | * | 12/1996 | Kawagoe et al. |
| 6,043,449 A | * | 3/2000 | Kanjo |
| 6,072,145 A | * | 6/2000 | Suita et al. |
| 6,118,095 A | * | 9/2000 | Nagano |

FOREIGN PATENT DOCUMENTS

| | | |
|---|---|---|
| JP | 4-147777 | 5/1992 |
| JP | 7-90388 | 10/1995 |

* cited by examiner

Primary Examiner—Tom Dunn
Assistant Examiner—Kiley Stoner
(74) Attorney, Agent, or Firm—McDermott, Will & Emery

(57) ABSTRACT

An inter-welding electrode moving amount detecting method includes the below steps: moving a driving section of electrode driving means having the driving section connected to at least one of a pair of electrodes provided to a welding gun; detecting an inter-welding electrode moving amount due to expansion/contraction of a nugget when a member to be welded is pressed, electrified and welded by the pair of electrodes; and obtaining the inter-welding electrode moving amounts by adding a moving amount of the driving section to an electrode moving direction due to the expansion/contraction of the nugget during welding and a deflection (alternatively, a strain amount) of the welding gun due to a pressing force.

10 Claims, 12 Drawing Sheets

INTER-WELDING ELECTRODE MOVING AMOUNT DETECTING METHOD AND APPARATUS THEREOF

BACKGROUND OF THE INVENTION

1. Field of the Invention

The present invention relates to an inter-welding electrode moving amount detecting method of detecting an amount of movement of pair of electrodes to a direction separating from/ approaching to each other due to expansion/ contraction of a nugget during welding, and relates to an apparatus thereof.

2. Description of the Related Art

Conventionally, in the field of resistance welding represented by spot welding, as a method of judging good/inferior welding quality at real time (during welding), a method of detecting an expansion amount of a nugget formed on a member to be welded as an inter-welding electrode moving amount is known. This utilizes that there is a deep causal relationship between thermal expansion and welding quality of an object to be welded during welding.

A physical phenomenon which is thermal expansion of the member to be welded is considered as an amount of movement between welding electrodes during welding. As to how to detect an inter-welding electrode moving amount or as to whether the detected result is processed to be a substitute property of the welding quality, various methods are suggested.

In general, as a detector for detecting an inter-welding electrode moving amount of a welding gun, a linear scale (scale which is capable of detecting a position in a linear direction), a laser distance measuring sensor or the like is used. Moreover, in a welding gun which uses a servo motor as driving means, a position detector which is contained in or provided to a motor can be used.

SUMMARY OF THE INVENTION

However, the above detectors for an inter-welding electrode moving amount cannot directly measure the physical phenomenon of a member to be welded during welding.

Namely, since interference between a welding jig or a member to be welded on a circumference of welding-shot point easily occurs, a detector for an inter-welding electrode moving amount cannot but be mounted to a portion separated from electrodes, namely, in a vicinity of a driving section or the like such as a rotating shaft or a piston rod connected to electrodes and moved (rotated or linearly moved) in driving means such as an air cylinder or a servo motor.

For this reason, a force which pushes back electrodes of a welding gun due to thermal expansion of a nugget is absorbed by mechanical loss such as deflection of a welding gun or friction of an air cylinder or a servo motor. For this reason, an accurate inter-welding electrode moving amount cannot be detected, and as a result, accuracy of judgment as to good/inferior welding quality is deteriorated.

Namely, exactly an inter-welding electrode moving amount which is a changing amount of an inter-electrode dimension is not detected, but only a moving amount of a driving section in a driving apparatus for moving electrodes is detected substitutionally. A disadvantage due to this is remarkable particularly in the case of a large-sized welding gun in which deflection of the welding gun is great.

The present invention has been achieved with such points in mind.

Therefore, it is an object of the present invention to provide an inter-welding electrode moving amount detecting method and an apparatus thereof which detect an inter-welding electrode moving amount during welding accurately so as to be capable of improving accuracy of judgment as to good/inferior welding quality.

To achieve the object, according to one aspect of the present invention, there is provided an inter-welding electrode moving amount detecting method comprising the steps of: moving a driving section of electrode driving means having the driving section connected to at least one of a pair of electrodes provided to opposed end portions of a welding gun to move the pair of electrodes to a direction approaching to each other; detecting an inter-welding electrode moving amount that the pair of electrodes are moved to a direction separating from/ approaching to each other due to expansion/contraction of a nugget when a member to be welded is pressed, electrified and welded by the pair of electrodes; and obtaining the inter-welding electrode moving amounts by adding a moving amount of the driving section to an electrode moving direction due to the expansion/contraction of the nugget during welding and a deflection amount of the welding gun due to a pressing force applied from the electrodes to the member to be welded.

On the other hand, according to another aspect of the present invention, there is provided an inter-welding electrode moving amount detecting apparatus, comprising: a pair of electrodes mounted to opposed end portions of a welding gun; electrode driving means having a driving section connected to at least one of the pair of electrodes; driving section moving amount detecting means for detecting a moving amount of said driving section to an electrode moving direction due to expansion/contraction of a nugget during welding; and control means for adding the moving amount detected by said driving section moving amount detecting means and a deflection amount of said welding gun due to a pressing force applied from said electrodes to a member to be welded so as to obtain the inter-welding electrode moving amount. In the construction, the driving section is moved so that one of said electrodes is moved to a direction where the electrodes approach to each other, and when said member to be welded is pressed and electrified and welded by said pair of electrodes, the inter-welding electrode moving amount that said pair of electrodes are moved to a direction separating from/ approaching to each other due to the expansion/contraction of the nugget is detected.

According to the above aspects, an inter-welding electrode moving amount during welding is detected accurately so that the forming state of the nugget is obtained definitely and accuracy of the judgment of good/inferior welding quality can be improved.

In other wards, the pressing force applied from the electrodes to the member to be welded can be detected more accurately, and the stiffness factor of the gun arm can be calculated more accurately.

Furthermore, those manners according to the present invention have a great advantage that a stiffness factor related to pressing force and a stiffness factor related to strain amount can be obtained easily without adding a new structure. Further, those manners can be applied commonly to various kinds of welding guns, and the stiffness factor related to pressing force and the stiffness factor related to strain amount can be easily checked or corrected suitably.

BRIEF DESCRIPTION OF THE ACCOMPANYING DRAWINGS

The above and further objects and novel features of the present invention will more fully appear from the following detailed description when the same is read in conjunction with the accompanying drawings, in which.

DESCRIPTION OF THE PREFERRED EMBODIMENT

Figure 1:
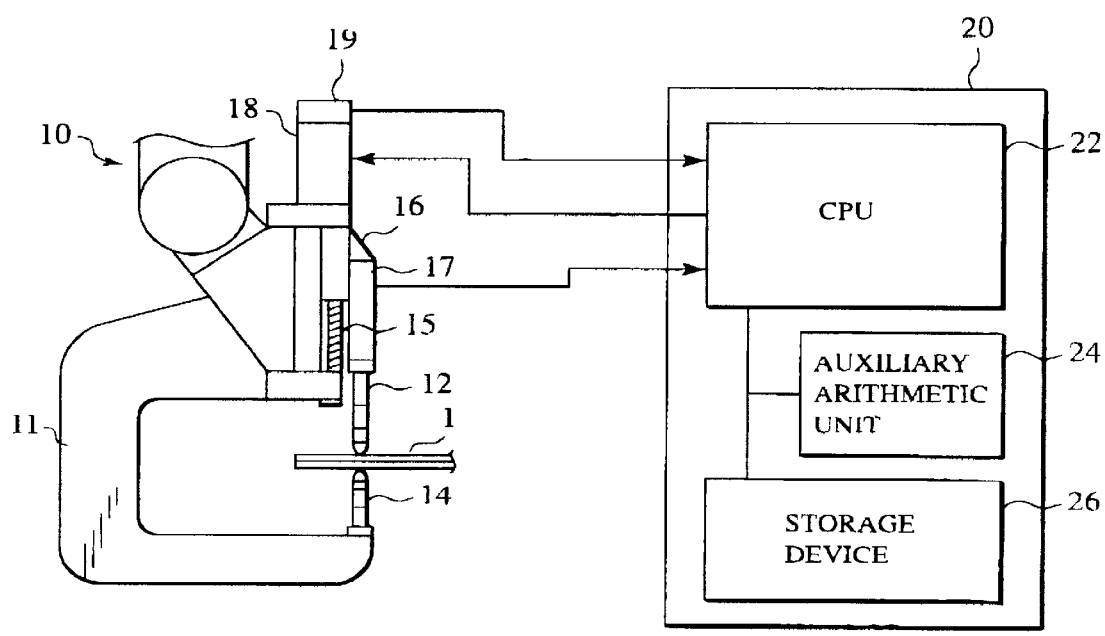
FIG. 1 is a block structural diagram schematically showing a welding apparatus of the present invention.

There will be detailed below the preferred embodiments of the present invention with reference to the accompanying drawings, FIG. 1 to FIG. 7 and FIG. 14. Like members are designated by like reference characters.

FIG. 1 is a block structural diagram schematically showing a welding apparatus of the present invention. This welding apparatus is composed of a welding gun 10 and a control unit 20.

The welding gun 10 has a gun arm 11, a movable side electrode 12, a fixed side electrode 14, a servo motor 18 (hereinafter, motor) as electrode driving means, and an encoder 19 as driving section moving amount detecting means. This welding gun 10 is normally mounted to a distal end of a robot arm or the like.

Meanwhile, the control unit 20 is composed of a central processing unit (CPU) 22, an auxiliary arithmetic unit 24 and a storage device 26.

A rotating shaft, not shown, as a driving section of the motor 18 is connected to a feed pendulum 15. This feed pendulum 15 is fitted into a supporting member 16 which supports the movable side electrode 12. At the time of welding work, rotation of the rotating shaft of the motor 18 is transmitted to the feed pendulum 15. When the feed pendulum 15 rotates, the supporting member 16 moves downward so that the movable side electrode 12 presses a member to be welded 1 by means of a pressing force.

The encoder 19 is mounted to the rotating shaft of the motor 18, and measures a moving amount of the driving section of the motor 18 (a rotational amount of the rotating shaft). A signal from the encoder 19 is transmitted to the CPU 22 so as to be utilized for calculating an inter-welding electrode moving amount during welding.

In addition, the CPU 22 outputs an instruction to the motor 18 on pressing or releasing of the movable side electrode 12 according to a welding program previously stored in the storage device 26 so as to control torque of the motor required for welding. Further, the CPU 22 controls an electric current to be applied to the electrodes.

The storage device 26 stores the welding program, welding conditions (welding applied force, welding current, electrifying time, electrifying interval) and the like.

Since most of welding guns which use a servo motor as electrode driving means are provided as an application of a robot, in general the control unit 20 is usually contained in a robot control unit. Therefore, also the motor 18 of the welding gun 10 is operated as one axis of a robot so that its position is controlled. For this reason, the encoder 19 which is a servo motor position detector is normally incorporated in the motor 18.

Particularly in the present embodiment, a pressing force detector 17 (a pressing force detecting means) for detecting a pressing force which is applied to the member to be welded 1 from the electrodes 12 and 14 is provided to the gun arm 11 to which the electrodes are mounted. More specifically, as shown in FIG. 1, the pressing force detector 17 is provided to the supporting member 16 which supports the movable side electrode 12. However, the pressing force detector 17 can be provided to an arbitrary portion of the gun arm 11 where a pressing force equivalent to a pressing force generated between the electrodes can be detected. Moreover, as the pressing force detector 17, for example, a pressure sensor is used. More particularly, a strain gauge is used in such a manner that a pressure value gained through a diaphragm provided in an input portion of the strain gauge is converted into electric pulse, or a piezoelectric element is used in such a manner that a pressure value gained through the piezoelectric element is directly converted into electric pulse. A signal from the pressing force detector 17 is transmitted to the CPU 22. In the CPU 22, a pressing force applied to the member to be welded 1 is utilized for calculating an inter-electrode moving amount during welding.

The welding work by means of a welding apparatus is carried out schematically as follows. At first, the member to be welded 1 is brought in contact with the electrodes 12 and 14 with pressure from its up-and-down direction by means of a predetermined welding pressing force. In a state that the member to be welded 1 is brought in contact with the electrodes 12 and 14, a welding current is supplied from a power source, not shown, to the electrodes 12 and 14 by control of the CPU 22 so that welding is started. When the welding is started, a nugget is started to be formed at a welding point of the member to be welded 1, and the member fuses so as to be thermally expanded. At this time, if a force due to expansion of the nugget at stronger than the welding pressing force, this force pushes back the electrode 12 so that the motor 18 is rotated reversely. Thereafter, when electrifying of the electrodes 12 and 14 is stopped, the nugget contracts. The expansion and contraction are carried out for predetermined time (welding time), and a suitable nugget is formed so that the welding is completed. A moving amount of the electrode 12 due to expansion and contraction of the nugget at the time of welding is measured as a rotating amount of the rotating shaft of the motor 18 by the encoder 19.

When the electrode 12 is brought in contact with the member to be welded 1 with pressure and a torque of the motor 18 is increased, the gun arm 11 of the welding gun 10 is deflected according to its stiffness. However, while the electrode 12 is being pressed, the gun arm 11 is maintained in a state that the pressing force and deflection are balanced. When the welding is started in this state, a deflection amount of the gun arm 11 is increased momentarily by thermal expansion of the nugget formed on the member to be welded 1. At this time, the pressing force and the deflection are imbalanced, and the electrode 12 is pushed back until the balanced state is obtained. A displacement amount of the electrode 12 is measured by the encoder 19.

Therefore, a value which is measured by the encoder 19 is not expansion and contraction of the nugget itself, but only a moving amount of the electrode 12 is measured as a rotating amount of the rotating shaft of the motor. Therefore, with only this value, an inter-welding electrode moving amount which is an amount that a pair of the electrodes 12 and 14 are moved to a direction separating from and/or approaching to each other due to expansion and/or contraction of the nugget cannot be detected accurately. The present invention provides means for solving this problem.

Figure 2:
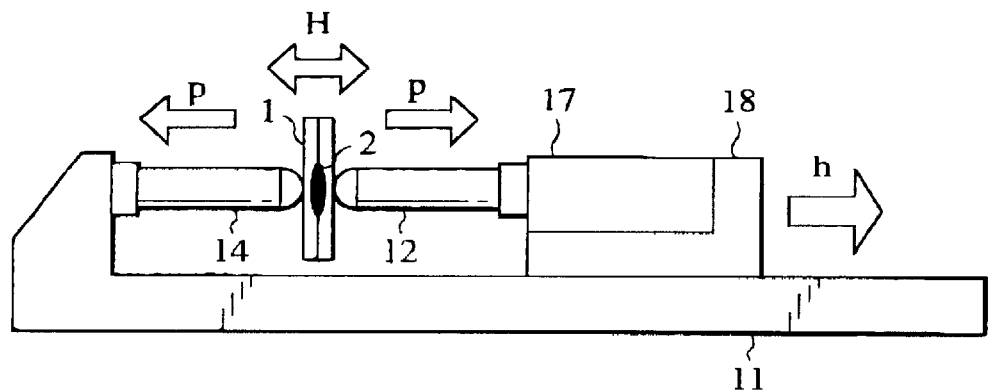
FIG. 2 is a schematic diagram for explaining a method of detecting an inter-welding electrode moving amount.
Figure 3:
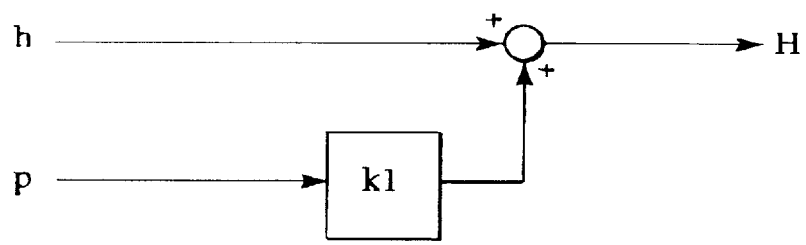
FIG. 3 is a control block diagram showing a method of detecting an inter-welding electrode moving amount.
Figure 4:
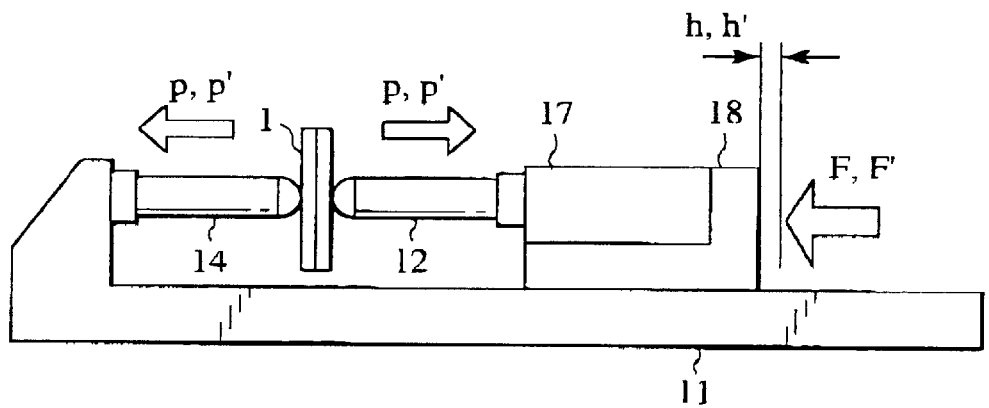
FIG. 4 is a schematic diagram for explaining a method of obtaining a stiffness factor of a welding gun.
Figure 5:
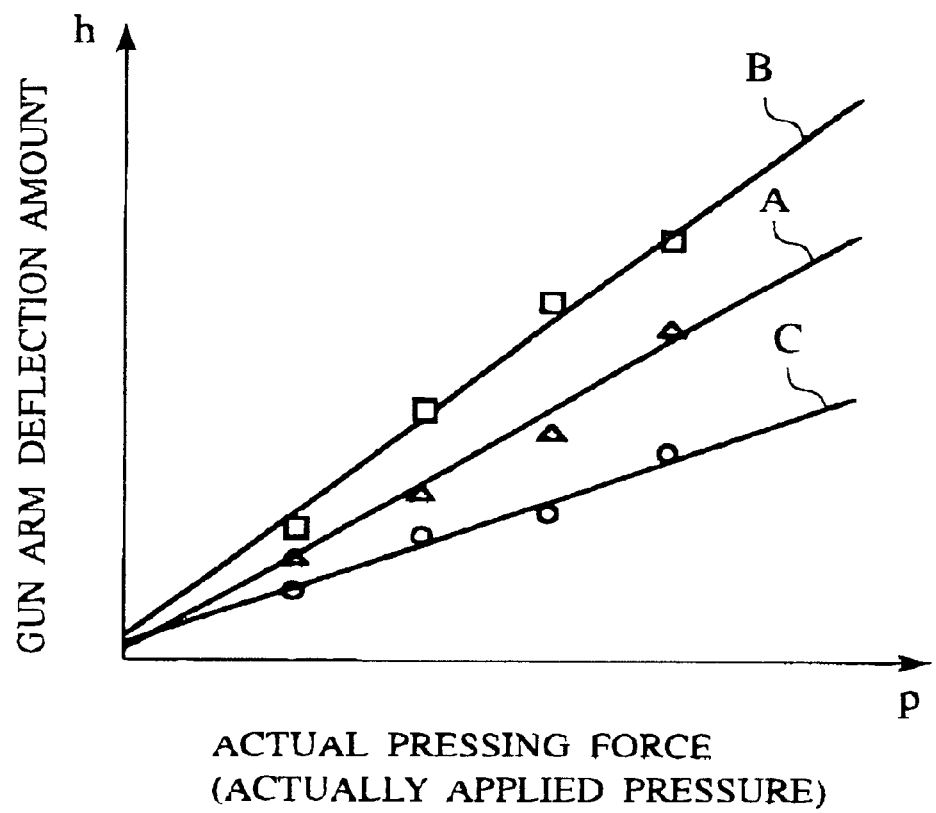
FIG. 5 is a diagram showing a relationship between a pressing force and a deflection amount of the welding gun.

FIG. 2 is a schematic diagram for explaining the method of detecting an inter-welding electrode moving amount. FIG. 3 is a control block diagram showing the method of detecting an inter-welding electrode moving amount. FIG. 4 is a schematic diagram for explaining the method of obtaining a stiffness factor of the welding gun. FIG. 5 is a diagram showing a relationship between a pressing force and a deflection amount of the welding gun.

As shown in FIGS. 2 and 3, in the present embodiment, a moving amount h of the driving section of the motor 18 to an electrode moving direction (a feed amount of the rotating shaft to an axial direction corresponding to a rotating amount) is added to a deflection amount pk1 which is obtained by multiplying a pressing force p applied from the electrodes 12 and 14 to the member to be welded 1 by a factor (hereinafter called as stiffness factor related to pressing force) k1 corresponding to stiffness of the gun arm 11. As a result, an inter-welding electrode moving amount H is obtained (H=h+pK1). The stiffness factor k1 is a deflection amount of the welding gun to the electrode moving direction when a pressing force is applied. As the stiffness is lower, the factor becomes larger, and as the stiffness is higher, the factor becomes smaller.

Namely, the encoder 19 which is a servo motor position detector contained in the motor 18 detects a moving amount h of the driving section of the motor 18 to the electrode moving direction due to thermal expansion and contraction of the nugget 2 during welding. A deflection amount pk1 of the gun arm 11 due to thermal expansion and contraction of the nugget 2 which is not output from the encoder 19 is obtained. The moving amount h and the deflection amount pk1 are added so that a true inter-welding electrode moving amount, namely, an amount that the pair of electrodes 12 and 14 are moved to the direction separating from/approaching to each other due to expansion and contraction of the nugget is obtained.

The deflection amount pk1 of the gun arm 11 can be obtained by multiplying an output of the pressing force detector 17 by the stiffness factor k1 related to pressing force. Here, since the pressing factor detector 17 is provided to the gun arm 11 to which the electrodes 12 and 14 are fastened. For this reason, in comparison with, for example, the case where an output value of the motor 18 as driving means of the electrodes 12 and 14 is utilized, the pressing force detector 17 is not influenced by mechanical loss which exists in a transmission path of a generated pressing force. Therefore, the pressing force p which is applied from the electrodes 12 and 14 to the member to be welded 1 can be detected more accurately, and the stiffness factor k1 of the gun arm 11 can be calculated more accurately.

As shown in FIGS. 3 and 4, the stiffness factor k1 related to pressing force is calculated based on a relationship between the pressing forces and the rotating amount of the rotating shaft of the motor 18 when the pair of electrodes 12 and 14 are brought into close to each other and at least two kinds of pressing forces are generated.

In other words, in the case where the stiffness factor k1 related to pressing force is calculated, an arbitrary motor generated force F is previously applied by the motor 18 of the welding gun 10, and a pressing force p, which is an output value of the pressing force detector 17 incorporated in the gun arm 11 at this time, and a position h of the driving section of the motor 18 in the electrode moving direction which was detected by the encoder 19 (an axial direction feed position corresponding to the rotating position of the rotating shaft; hereinafter called as motor position) are stored in the storage device 26. At the time of measurement, as to whether or not an inclusion such as the member to be welded 1 is provided between the electrodes 12 and 14 is arbitrary. Next, a pressing force p', which is an output value of the pressing force detector 17 at the time of applying a suitable motor generated force F' different from the above force, and a motor position h' detected by the encoder 19 are stored in the storage device 26. In such a manner, data composed of pairs of pressing forces and motor positions at least two or more points are obtained.

Here, deflection of the gun arm 11 due to application of pressing force appears as a change in the motor position. Therefore, a change amount of the pressing force divides a change amount of the motor position at respective points of the obtained data composed of the pairs, namely, a deflection amount of the gun arm 11 so that the stiffness factor k1 related to pressing force of the gun arm 11 can be obtained.

This manner has a great advantage that the stiffness factor k1 related to pressing force can be obtained easily without adding a new structure. Further, this manner can be applied commonly to various kinds of welding guns, and the stiffness factor k1 related to pressing force can be easily checked or corrected suitably.

For example, in the case where the data of the pair of pressing force and motor position are at two points of (p,h) and (p', h'), k1=(h'−h)/(p'−p).

As shown in FIG. 5, in the case where data at many points are obtained, a regression line A is obtained and its inclination can be the factor k1. In the case where the stiffness of the welding gun is low, a regression line B with large inclination is obtained in FIG. 5, and in the case where the stiffness is high, a regression line C with small inclination is obtained.

Next, there will be explained below a specific method of detecting an inter-welding electrode moving amount in the welding apparatus with reference to the flow charts shown in FIGS. 6 and 7.

In the present embodiment, before the welding work is carried out, the stiffness factor k1 of the gun arm 11 is previously obtained.

Figure 6:
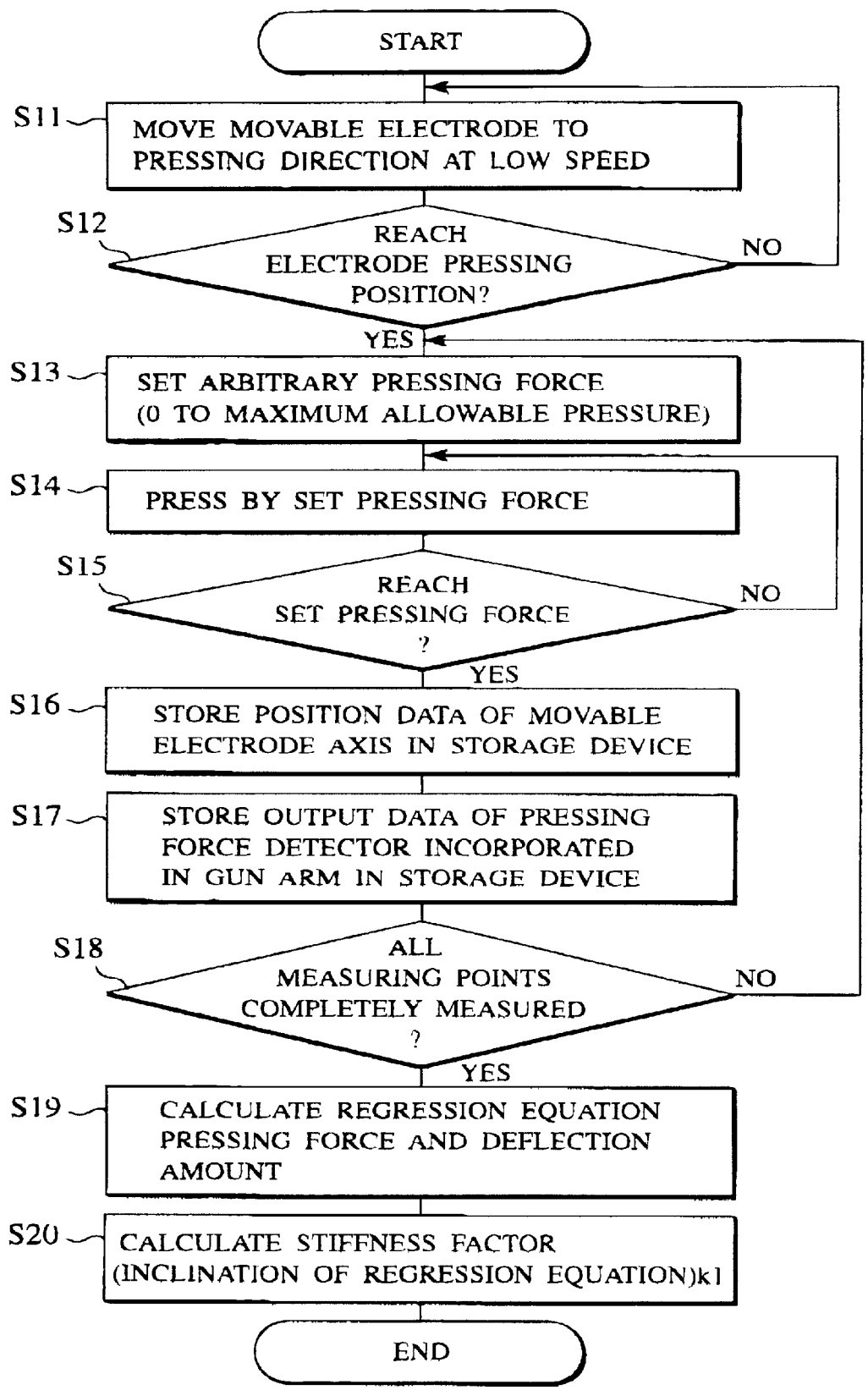
FIG. 6 is a flow chart showing a method of obtaining the stiffness factor of the welding gun.

As shown in FIG. 6, the CPU 22 actuates the motor 18 so as to move the movable electrode 12 to a pressing direction, namely, a direction approaching to the electrode 14 at a low speed (S11). When the electrode 12 reaches a position where the member to be welded 1 is pressed (S12), one pressing force, which is arbitrarily determined within a range of a maximum permissible pressing force of the welding gun, is set (S13). The pressing force which is set here is actually managed by a torque value of the motor 18, for example.

The CPU 22 operates the motor 18 so as to press by using the set pressing force as a target (S14). At the time of reaching the set pressing force (S15), the CPU 22 stores position data of the movable electrode 12 in the axial direction detected by the encoder 19 into the storage device 26 (S16). Moreover, the CPU 22 stores output data (actual generated pressing force) of the pressing force detector 17 incorporated in the gun arm 11 into the storage device 26 (S17).

The operations S13 through S17 are repeated at least two or more times, and when the pressing force and the motor position, namely, all the data of the pairs of the pressing forces and the deflection amount of the welding gun are completely measured (S18), regression lines of the pressing forces and the deflection amounts of the welding gun are calculated as shown in FIG. 5 (S19). The stiffness factor k of the gun arm 11 is calculated from inclinations of the regression lines.

Next, the welding work is started. After a robot arm, not shown, is moved and the welding gun 10 is moved to a welding portion of the member to be welded 1, the CPU 22 operates the motor 18 so as to move the movable electrode 12 to the pressing direction, namely, the direction approaching to the electrode 14 at a low speed (S32). When the electrode 12 reaches a position where the member to be welded 1 is pressed (S32), the CPU 22 operates the motor 18 so as to press using the welding pressing force which is previously set as the welding condition as a target. At the time of reaching the welding pressing force (S34), the CPU 22 stores position data hO of the movable electrode 12 in the axial direction detected by the encoder 19 and output data pO of the pressing force detector 17 incorporated in the gun arm 11 (actual generated pressing force) into the storage device 26 (S35).

After n=1 as initial measurement is input (S36), electrifying is started by welding current set as the welding condition (S37). The CPU 22 stores the position data hn of the movable electrode 12 in the axial direction detected by the encoder 19 into the storage device 26 (S38). The moving amount Hnh of the movable electrode 12 from before the starting of electrifying is calculated according to an equation of Hnh=hn−hO. Moreover, the output data pn of the pressing force detector 17 incorporated in the gun arm 11 is stored in the storage device 26 (S40).

Next, the deflection amount Hnp of the welding gun from before the starting of electrifying is calculated according to an equation of Hnp=(pn−pO)×K1 by using the stiffness factor k1 related to pressing force of the gun arm 11 obtained in FIG. 6 (S41). The true inter-welding electrode moving amount Hn is calculated according to Hn=Hnh+Hnp (S42). The above-mentioned operation S38 through S42 are repeated, and the value of the inter-welding electrode moving amount Hn is obtained at predetermined time intervals such as n=1, 2, . . . (S45). When a judgment is made that previously set electrifying time is completed (S43), the electrifying is stopped (S44).

Figure 7:
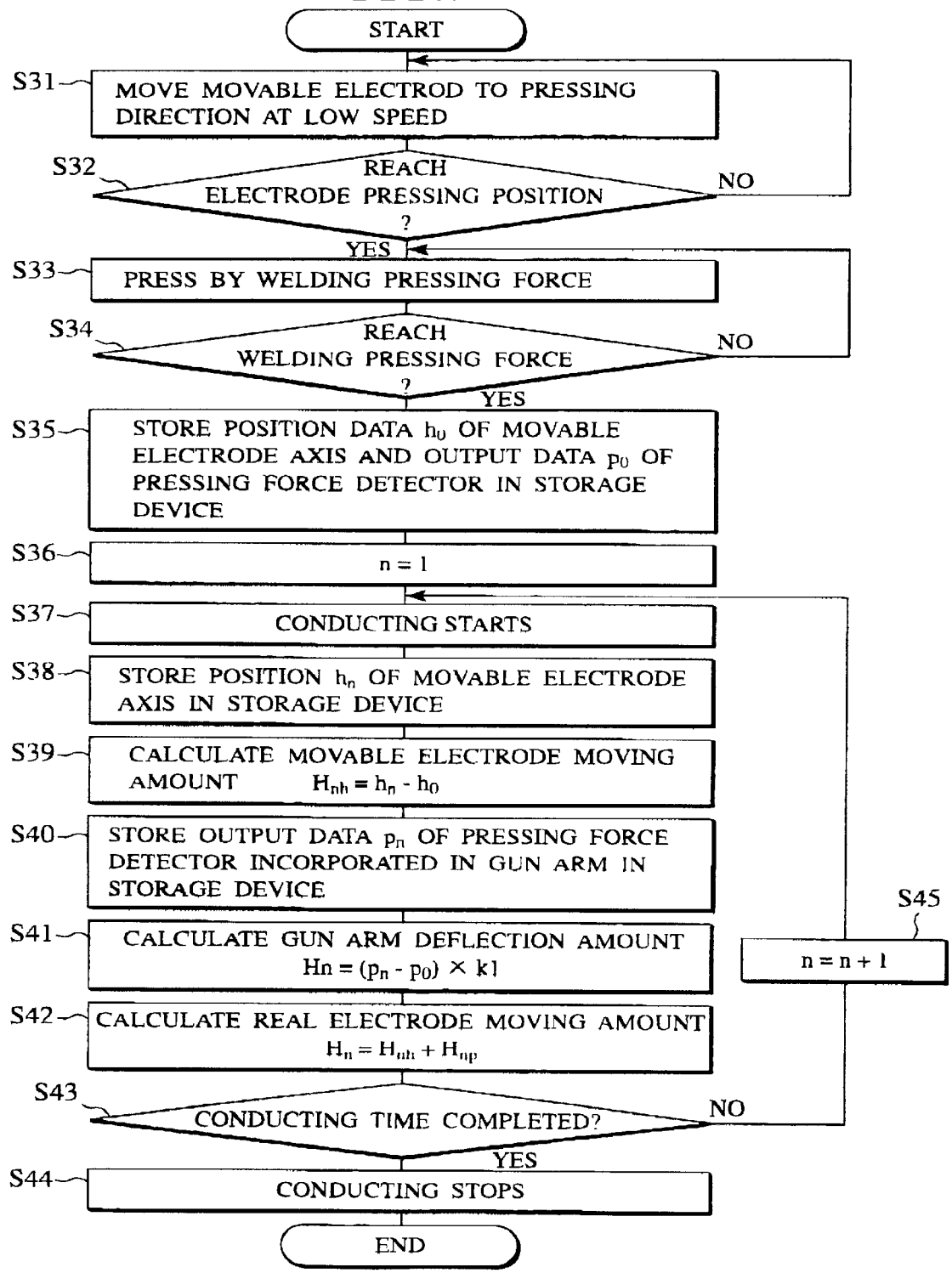
FIG. 7 is a flow chart showing a specific detecting method for an inter-welding electrode moving amount.
Figure 14:
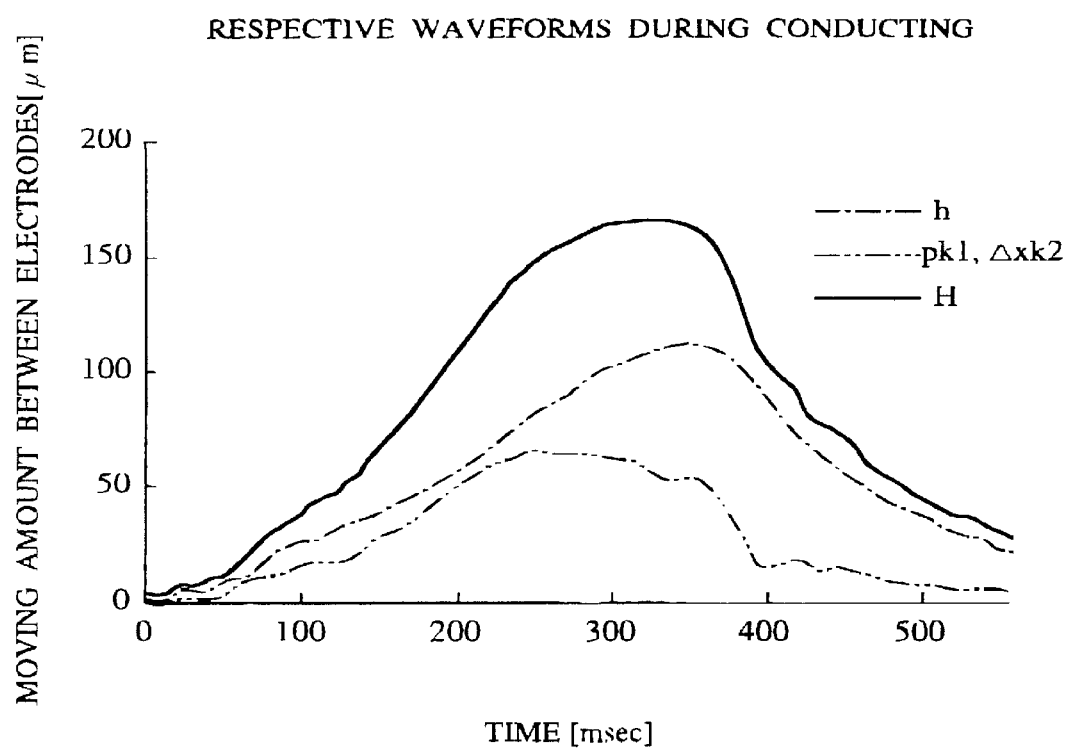
FIG. 14 is a diagram showing one example of a time change of the inter-welding electrode moving amounts obtained by the detecting method of FIG. 7 or FIG. 13.

FIG. 14 is a diagram showing one example of a time change of the inter-welding electrode moving amount obtained by the detecting method of FIG. 7.

As shown in FIG. 14, the true inter-welding electrode moving amount is not obtained only by the motor position h, but it is found that the deflection amount pk1, which is obtained by multiplying the pressing force p by the stiffness factor k1 of the welding gun, is added to the motor position h so that the true inter-welding electrode moving amount H can be obtained for the first time. A forming state of the nugget is obtained from the maximum value, inclination or a change amount due to contraction in the graph of the true inter-welding electrode moving amount H. As a result, good/inferior welding quality can be judged.

According to the present embodiment, an inter-welding electrode moving amount during welding is detected accurately so that the forming state of the nugget is obtained definitely and accuracy of the judgment of good/inferior welding quality can be improved.

Referring now to FIG. 8 to FIG. 14, a second embodiment of an inter-welding electrode moving amount detecting apparatus and method according to the present invention will be described hereinbelow.

Figure 8:
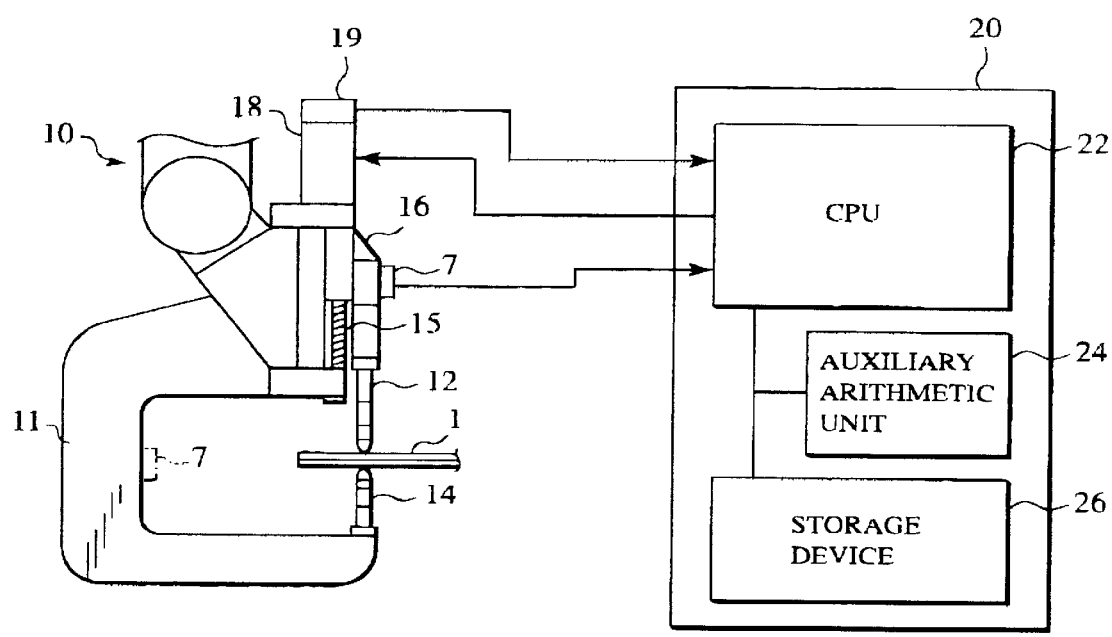
FIG. 8 is a block structural diagram schematically showing another embodiment of a welding apparatus according to the present invention.

FIG. 8 is a block structural diagram schematically showing a welding apparatus of a second embodiment according to the present invention. In the figure 8, the pressing force detector 17 shown in FIG. 1 is replaced with a strain amount detector 7. Like members are designated by like reference characters.

The welding gun 10 shown in FIG. 8 has a gun arm 11, a movable side electrode 12, a fixed side electrode 14, a servo motor 18 (hereinafter, motor) as electrode driving means, and an encoder 19 as driving section moving amount detecting means. This welding gun 10 is normally mounted to a distal end of a robot arm or the like. Meanwhile, the welding gun 10 is electrically connected to the control unit 20 so that a central processing unit (hereinafter, CPU) 22 composed in the control unit 20 controls a servo moor 18 according to welding programs previously stored in a storage device 26, thereby driving a movable side electrode 12 to be pressed or to be opened.

A rotating shaft, not shown, as a driving section of the motor 18 is connected to a feed pendulum 15. This feed pendulum 15 is fitted into a supporting member 16 which supports the movable side electrode 12. At the time of welding work, rotation of the rotating shaft of the motor 18 is transmitted to the feed pendulum 15. When the feed pendulum 15 rotates, the supporting member 16 moves downward so that the movable side electrode 12 presses a member to be welded 1 by means of a pressing force.

The gun arm 11 mounted with the electrodes is provided with a strain amount detector 7 which detects a distortion amount of the welding gun 10 generated when a pressing force is applied to a member to be welded from the electrodes 12 and 14. Specifically, as shown in FIG. 8, the strain amount detector 7 is provided on a supporting member 16 supporting the movable side electrode 12.

Incidentally, the strain amount detector 7 may be provided at any place where a distortion amount occurring due to pressing force generated between the electrodes can be detected, and it may be provided at the gun arm 11, for example, as shown with an imaginary line. Also, for example, a strain sensor can be used as the strain amount detector 7. Specifically, a system where a strain amount obtained by a strain gauge is directly output as electrical signals, a system where a strain amount is detected by stacked piezoelectric elements or the like to be output as electrical signals or the like can be employed. Since these strain sensors themselves are known, detailed explanation thereof will be omitted. Especially, in the second embodiments, since the strain amount detector 7 is attached to the gun arm 11 or the like to detect a strain amount directly, mount easiness thereof is superior to the applied pressure detector 17 and structure thereof is simple.

Signals from the strain amount detector 7 are transmitted to the CPU 22 where a pressing force applied to the member to be welded 1 is utilized to calculate the inter-electrode moving amount during welding.

The welding work by means of a welding apparatus is carried out schematically as follows. At first, the member to be welded 1 is brought in contact with the electrodes 12 and 14 with pressure from its up-and-down direction by means of a predetermined welding pressing force. In a state that the member to be welded 1 is brought in contact with the electrodes 12 and 14, a welding current is supplied from a power source, not shown, to the electrodes 12 and 14 by control of the CPU 22 so that welding is started. When the welding is started, a nugget is started to be formed at a welding point of the member to be welded 1, and the member fuses so as to be thermally expanded. At this time, if a force due to expansion of the nugget is stronger than the welding pressing force, this force pushes back the electrode 12 so that the motor 18 is rotated reversely. Thereafter, when electrifying of the electrodes 12 and 14 is stopped, the nugget contracts. The expansion and contraction are carried out for predetermined time (welding time), and a suitable nugget is formed so that the welding is completed. A moving amount of the electrode 12 due to expansion and contraction of the nugget at the time of welding is measured as a rotating amount of the rotating shaft of the motor 18 by the encoder 19.

When the electrode 12 is brought in contact with the member to be welded 1 with pressure and a torque of the motor 18 is increased, the gun arm 11 is deflected according to its stiffness. However, while the electrode 12 is being pressed, the gun arm 11 is maintained in a state that the pressing force and deflection are balanced. When the welding is started in this state, a deflection amount of the gun arm 11 is increased momentarily by thermal expansion of the nugget formed on the member to be welded 1. At this time, the pressing force and the deflection are imbalanced, and the electrode 12 is pushed back until the balanced state is obtained. A displacement amount of the electrode 12 is measured by the encoder 19.

Therefore, a value which is measured by the encoder 19 is not expansion and contraction of the nugget itself, but only a moving amount of the electrode 12 is measured as a rotating amount of the rotating shaft of the motor. Therefore, with only this value, an inter-welding electrode moving amount which is an amount that a pair of electrodes 12 and 14 are moved to a direction separating from and/or approaching to each other due to expansion and/or contraction of the nugget cannot be detected accurately. The present invention provides means for solving this problem.

Figure 9:
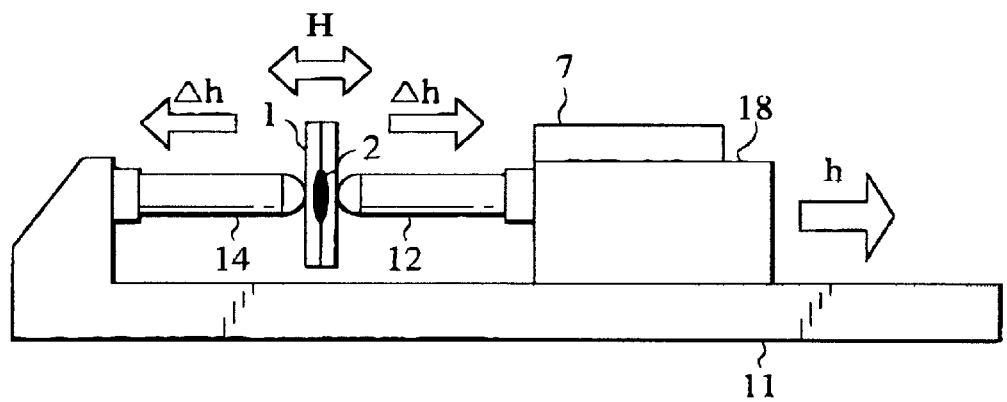
FIG. 9 is a schematic diagram for explaining a method of detecting an inter-welding electrode moving amount.
Figure 10:
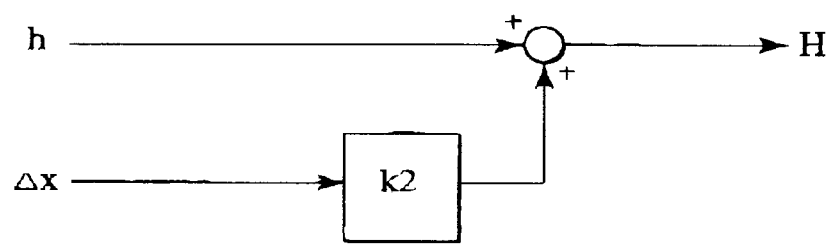
FIG. 10 is a control block diagram showing a method of detecting an inter-welding electrode moving amount.
Figure 11:
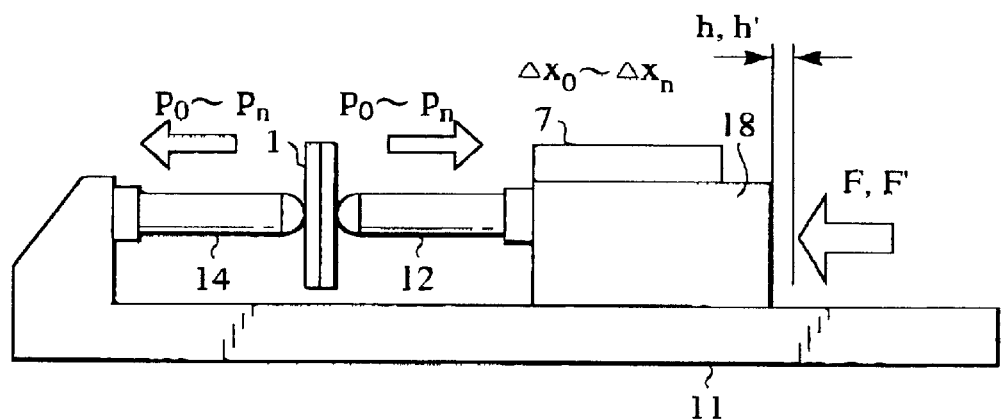
FIG. 11 is a schematic diagram for explaining a method of obtaining a stiffness factor of a welding gun.

FIG. 9 is a schematic diagram for explaining the method of detecting an inter-welding electrode moving amount. FIG. 10 is a control block diagram showing the method of detecting an inter-welding electrode moving amount. FIG. 11 is a schematic diagram for explaining the method of obtaining a stiffness factor of the welding gun. FIG. 5 is a diagram showing a relationship between a pressing force and a deflection amount of the welding gun.

As shown in FIGS. 9 and 10, in the present embodiment, a moving amount h of the driving section of the motor 18 to an electrode moving direction (a feed amount of the rotating shaft to an axial direction corresponding to a rotating amount) is added to a deflection amount $\Delta x \times k2$ which is obtained by multiplying a strain amount $\Delta x$ generated in the gun arm 11 by a pressing force applied from the electrodes 12 and 14 to the member to be welded 1, by a factor corresponding to stiffness related to strain amount (called as stiffness factor related to strain amount) k2 corresponding to stiffness related to strain amount $\Delta x$ of gun arm 11. As a result, an inter-welding electrode moving amount H is obtained ($H = h + \Delta x \times k2$). the stiffness factor k is a deflection amount of the welding gun to the electrode moving direction when a pressing force is applied. As the stiffness if lower, the factor becomes larger, and as the stiffness is higher, the factor becomes smaller.

Namely, the encoder 19 which is a servo motor position detector contained in the motor 18 detects a moving amount $\Delta h$ of the driving section of the motor 18 to the electrode moving direction due to thermal expansion and contraction of the nugget 2 during welding. An deflection amount $\Delta x \times k2$ of the gun arm 11 due to thermal expansion and contraction of the nugget 2 which is not output from the encoder 19 is obtained. The moving amount $\Delta h$ and the deflection amount $\Delta x \times k2$ are added so that a true inter-welding electrode moving amount, namely, an amount that the pair of electrodes 12 and 14 are moved to the direction separating from/approaching to each other due to expansion and contraction of the nugget is obtained.

The deflection amount $\Delta x \times k2$ of the gun arm 11 can be obtained by multiplying an output of the strain amount detector 7 by the stiffness factor k2. Here, since the strain amount detector 7 is provided to the gun arm 11 to which the electrodes 12 and 14 are fastened. For this reason, in comparison with, for example, the case where an output value of the motor 18 as driving means of the electrodes 12 and 14 is utilized, the strain amount detector 7 is not influenced by mechanical loss which exists in a transmission path of a generated pressing force. Therefore, the pressing force which is applied from the electrodes 12 and 14 to the member to be welded 1 can be detected more accurately, and the stiffness factor k2 of the gun arm 11 can be calculated more accurately.

As shown in FIGS. 10 and 11, the stiffness factor k2 is calculated based on a relationship between the pressing forces and the rotating amount of the rotating shaft of the motor is when the pair of electrodes 12 and 14 are brought into close to each other and at least two kings of pressing forces are generated.

In other words, in the case where the stiffness factor k2 related to strain amount is calculated: an arbitrary motor generated force F is previously applied by the motor 18 of the welding gun 10(at this moment, the pressing force applied to the electrodes 12 and 14 is PO); strain amount $\Delta x0$ is output from the strain amount detector 7 mounted to the gun arm 11; the output strain amount $\Delta x0$ and a position h of the driving section of the motor 18 in the electrode moving direction which was detected by the encoder 19 (an axial direction feed position corresponding to the rotating position of the rotating shaft hereinafter called as motor position) are stored in the storage device 26.

At the time of measurement, as to whether or not an inclusion such as the member to be welded 1 is provided between the electrodes 12 and 14 is arbitrary. Next, a suitable motor generated force F' different from the above force is applied (at the time, the pressing force applied to the electrodes 12 and 14 is "pn"), and a motor position h' detected by the encoder 19 and strain amount Δ×n (which is output from the strain amount detector 7) are further stored in the storage device 26. In such a manner, data composed of pairs of pressing forces and motor positions at least two or more points are obtained.

Here, deflection of the gun arm 11 due to application of pressing force appears as a change in the motor position. Therefore, a change amount of the pressing force divides a change amount of the motor position at respective points of the obtained data composed of the pairs, namely, a deflection amount of the gun arm 11 so that the stiffness factor k2 of the gun arm 11 can be obtained.

This manner has a great advantage that the stiffness factor k2 can be obtained easily without adding to new structure. Further, this manner can be applied commonly to various kinds of welding guns, and the stiffness factor k2 can be easily checked or corrected suitable.

For example, the data of the pair of strain amount and motor position includes two points of (Δ×0, h) and (Δ×n,h'), k2=(h'−h)/(Δ×n−Δ×0) can be obtained.

At the time, when data at many points are captured, a regression line is obtained by method of least square and its inclination can be the factor k2. This regression expression is derived in the following manner. First of all, application of any pressing force is performed by the motor 18 of the welding gun 10, and the output value Δ×0 of the strain amount detector 7 and the position h0 of the motor 18 at this time are stored in the storage device 26. Next, application of any pressing force different from the previous one is performed, the output value Δ×1 of the strain amount detector 7 and the position h1 of the motor 18 are stored in the storage device 26. Like the above, the strain amount and the motor position are obtained at two or more points (Δ×0 to Δ×n, h0 to hn), and the regression expression can be derived from change amount in strain amount and the change amount in position in the electrode moving direction at respective points by using method of least square. Since the method of least square is known, detailed description thereof will be omitted.

Next, there will be explained below a specific method of detecting an inter-welding electrode moving amount in the welding apparatus with reference to the flow charts shown in FIGS. 12 and 13.

In the present embodiment, before the welding work is carried out, the stiffness factor k2 of the gun arm 11 is previously obtained.

Figure 12:
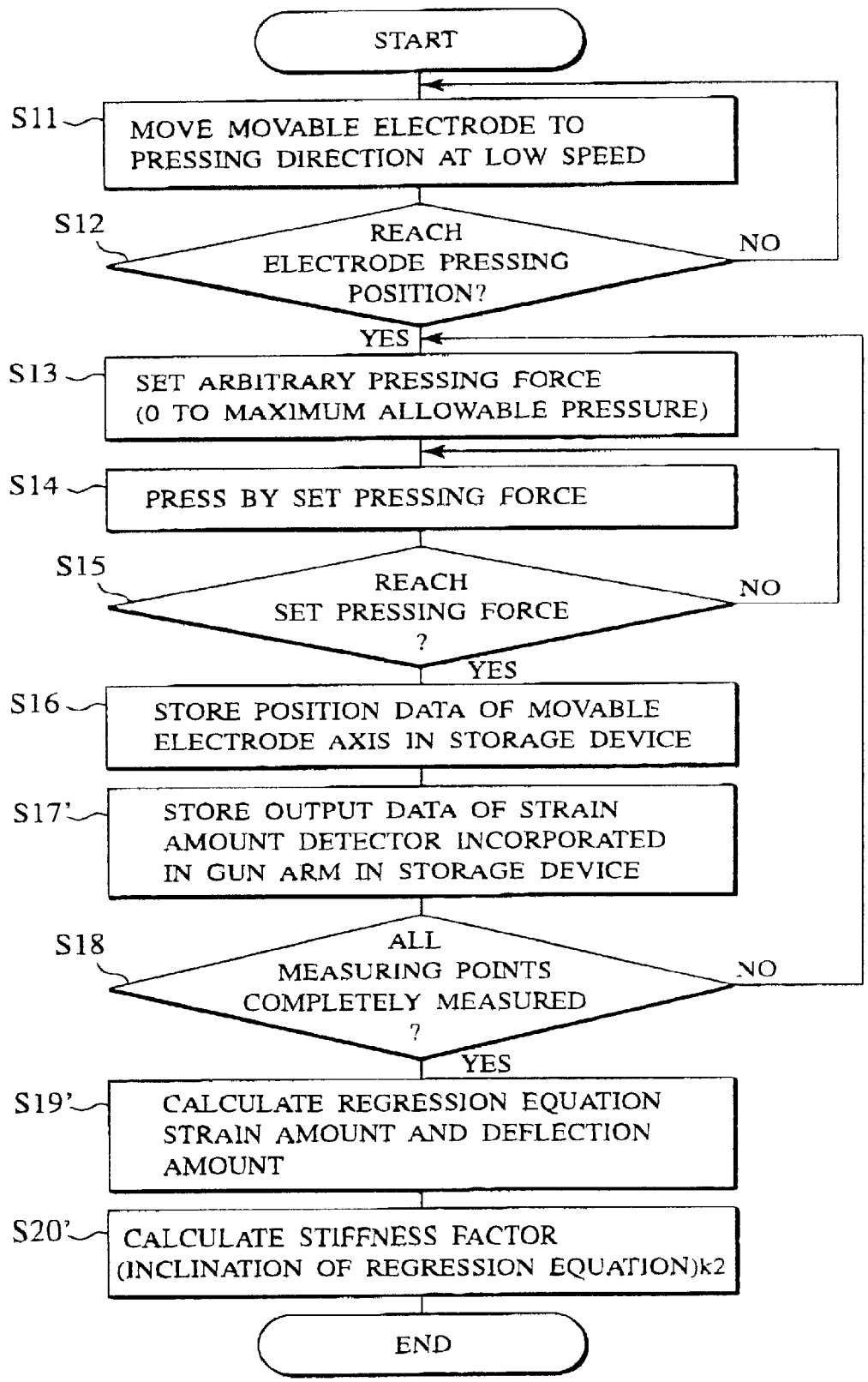
FIG. 12 is a flow chart showing a method of obtaining the stiffness factor of the welding gun.

As shown in FIG. 12, the CPU 22 actuates the motor 18 so as to move the movable electrode 12 to a pressing direction, namely, a direction approaching to the electrode 14 at a low speed (S11). When the electrode 12 reaches a position where the member to be welded 1 is pressed (S12), one pressing force, which is arbitrarily determined within a range of a maximum permissible pressing force of the welding gun, is set (S13). The pressing force which is set here is actually managed by a torque value of the motor 18, for example.

The CPU 22 operates the motor 18 so as to press by using the set pressing force as a target (S14). At the time of reaching the set pressing force (S15), the CPU 22 stores position data of the movable electrode 12 in the axial direction detected by the encoder 19 into the storage device 26 (S16). Moreover, the CPU 22 stores output data (actual generated strain amount) of the strain amount detector 7 incorporated in the gun arm 11 into the storage device 26 (S17').

The operations S13 through S17 are repeated at least two or more times, and when the strain amount and the motor position, namely, all the data of the pairs of the strain amounts and the deflection amount of the welding gun are completely measured (S18), regression lines of the pressing forces and the deflection amounts of the welding gun are calculated as shown in FIG. 5 (S19'). The stiffness factor k2 of the gun arm 11 is calculated from inclinations of the regression lines (S20').

Next, the welding work is started. After a robot arm not shown is moved and the welding gun 10 is moved to a welding portion of the member to be welded 1, the CPU 22 operates the motor 18 so as to move the movable electrode 12 to the pressing direction, namely, the direction approaching to the electrode 14 at a low speed (S31). When the electrode 12 reaches a position where the member to be welded 1 is pressed (S32), the CPU 22 operates the motor 18 so as to press using the welding pressing force which is previously set as the welding condition as a target. At the time of reaching the welding pressing force (S34), the CPU 22 stores position data h0 of the movable electrode 12 in the axial direction detected by the encoder 19 and output data x0 of the strain amount detector 7 incorporated in the gun arm 11 (actual generated strain amount) into the storage device 26 (S35').

After n=1 as initial measurement is input (S36), electrifying is started by welding current set as the welding condition (S37). The CPU 22 stores the position data hn of the movable electrode 12 in the axial direction detected by the encoder 19 into the storage device 26 (S38). The moving amount hn−hO. Moreover, the output data xn of the strain amount detector 7 incorporated in the gun arm 11 is stored in the storage device 26 (S40').

Next, the deflection amount Hnp of the welding gun from before the starting of electrifying is calculated according to an equation of Hnx=(xn−xO)×k2 by using the stiffness factor k2 of the gun arm 11 obtained in FIG. 12 (S41'). The true inter-welding electrode moving amount Hn is calculated according to Hn=Hnh+Hnx(S42'). The above-mentioned operation S38 through S42 are repeated, and the value of the inter-welding electrode moving amount Hn is obtained at predetermined time intervals such as n=1, 2,. . . (S45). When a judgment is made that previously set electrifying time is completed (S43), the electrifying is stopped (S44).

Figure 13:
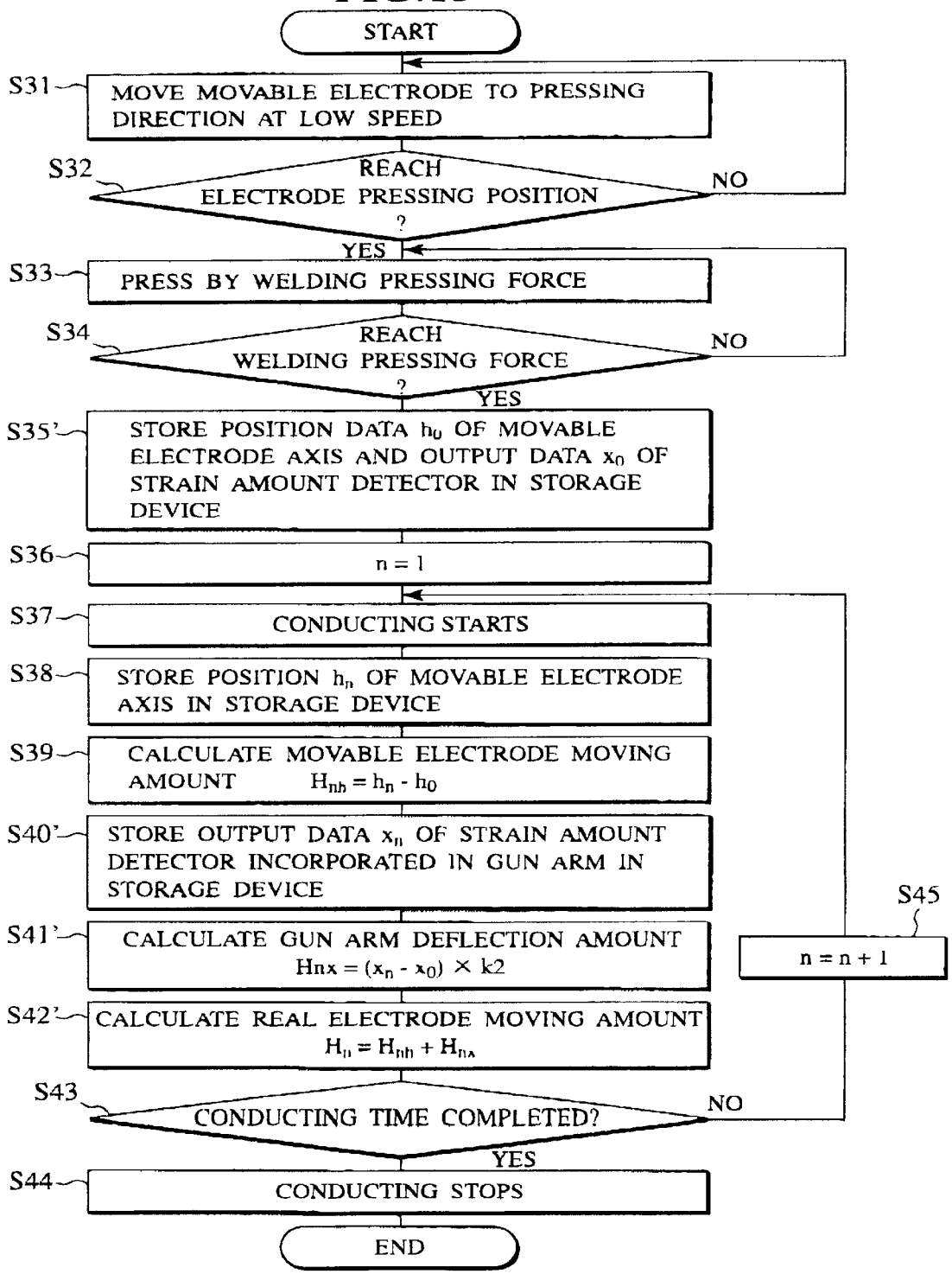
FIG. 13 is a flow chart showing a specific detecting method for an inter-welding electrode moving amount

FIG. 14 is a diagram showing one example of a time change of the inter-welding electrode moving amount obtained by the detecting method of FIG. 13.

As shown in FIG. 14, the true inter-welding electrode moving amount is not obtained only by the motor position h, but it is found that the deflection amount Δ×k2, which is obtained by multiplying the strain amount Δ× by the stiffness factor k2 related to strain amount of the welding gun, is added to the motor position h so that the true inter-welding electrode moving amount H can be obtained for the first time. A forming state of the nugget is obtained from the maximum value, inclination or a change amount due to contraction in the graph of the true inter-welding electrode moving amount H. As a result, good/inferior welding quality can be judged.

Incidentally, as shown in FIG. 8, an example where the strain amount detector 7 is provided at the supporting member 16 positioned on the side of the movable side electrode 12 has been shown, but the strain amount detector 7 may be provided the gun arm 11 positioned on the side of the fixed side electrode 14, for example, as shown with an imaginary line. When the strain amount detector 7 is provided on the gun arm 11 in this manner, the strain amount of the gun arm 11 is made large by the pressing force, so that larger output value can be obtained and the strain amount can be detected more exactly. That is, the above-mentioned welding gun is referred to as C gun type, and the fixed side electrode is provided at the gun arm 11 structured in a largely curved manner so as to avoid interference with the member to be welded. For this reason, a large strain amount can be obtained with a small pressing force at the largely curved gun arm 11 positioned on the side of the fixed side electrode.

In this manner, according to this embodiment, an inter-welding electrode moving amount is detected accurately so that the forming state of the nugget can be obtained properly and accuracy of the judgement about goodness/inferiority of welding quality can be improved.

Figure 15:
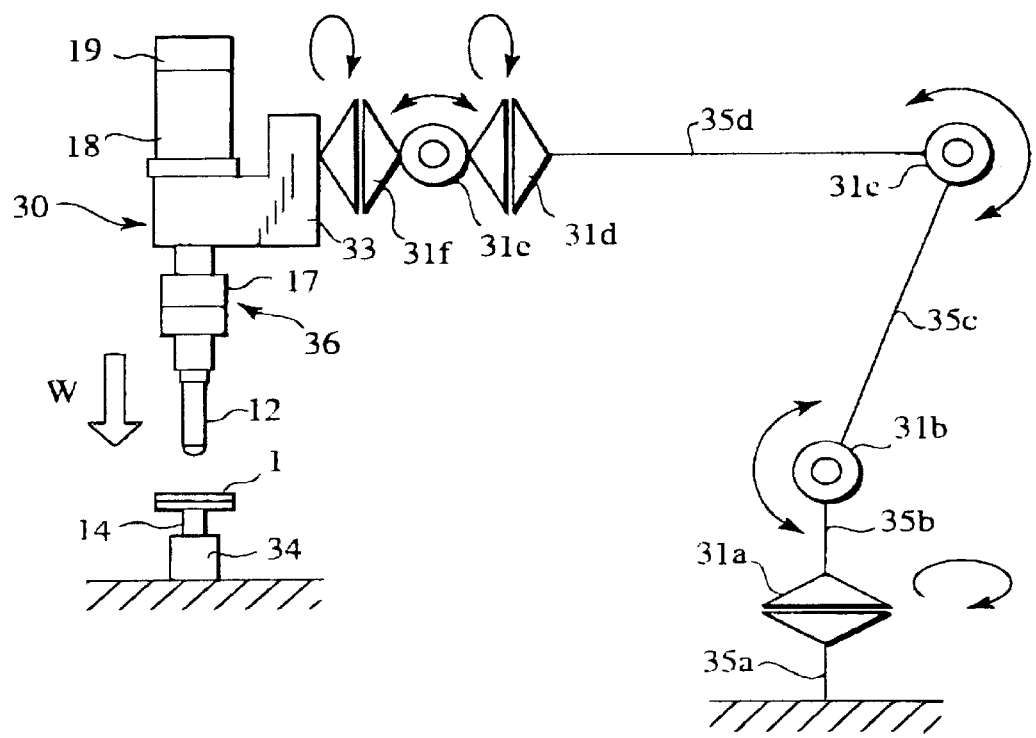
FIG. 15 is a block structural diagram schematically showing another embodiment of a welding apparatus according to the present invention.
Figure 16:
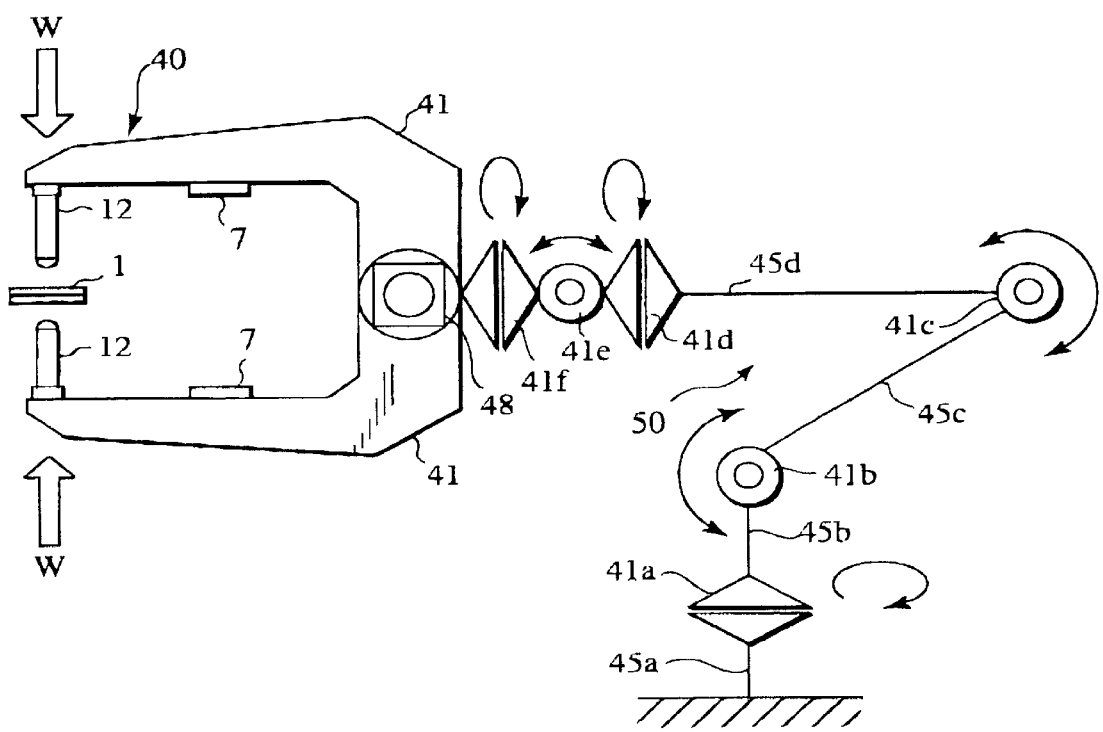
FIG. 16 is a block structural diagram schematically showing still another embodiment of a welding apparatus according to the present invention.

FIGS. 15 and 16 are block diagrams showing still other embodiments. In the first and second embodiments, explanation about the C gun type as the type of the welding gun 10 has been made, but embodiments shown in FIGS. 15 and 16 show judgement about which of the pressing force detector 17 and the strain amount detector 7 should be selected as aspects of other robot welding guns.

Here, FIG. 15 shows a stud gun type where one electrode is pressed on to one surface of a member to be welded, and FIG. 16 shows a x gun type where a work is sandwiched by a pair of electrodes.

A welding gun 30 of the stud gun type shown in FIG. 15 is mounted to a supporting portion 33 provided at a joint 31f of a robot with 6 degrees of freedom comprising arms 35a to 35d and joints 31a to 31f (incidentally, such a structure may be employed that an arm is provided at the joint 31f and the supporting portion 33 is mounted to a distal end of this arm).

A movable side electrode 12 is provided to the supporting portion 33 through an electrode holder 36 and the supporting portion 33 is provided with a servo motor 18 (hereinafter, motor) as electrode driving means and an encoder 19 as driving portion moving amount detecting means. Meanwhile, a fixed side electrode 14 is provided at a portion of a fixed portion 34 opposed to the movable side electrode 12.

Incidentally, as the welding gun 30 is connected to a control device 20 (not shown) in the same manner as the above-mentioned embodiments, explanation will be omitted.

A rotational shaft (not shown) as a driving portion of the motor 18 is connected to a feeding screw (not shown), and the electrode holder 36 is moved downward by rotation of the feeding screw so that the movable side electrode 12 presses a member to be welded 1 with a predetermined pressing force W.

The encoder 19 is mounted to the rotational shaft of the motor 18 and the moving amount (rotation amount of the rotational shaft) of the driving portion of the motor 18 is measured. A signal from the encoder 19 is transmitted to the CPU 22 (not shown) to be used for calculation of inter-welding electrode moving amount during welding. Also, the CPU 22 outputs a pressing instruction or an opening instruction to the motor 18 so as to move the movable side electrode 12 to control the torque of the motor required for welding according to a welding program which has been stored in the storage device 26 in advance. Furthermore, the CPU 22 performs control on current applied to the electrodes in the same manner as the above, and its explanation will be omitted.

In this embodiment, especially, the pressing force detector 17 for detecting a pressing force applied to the member to be welded from the electrodes 12 and 14 is provided on the electrode holder 36. Incidentally, the pressing force detector 17 is constituted with a pressure sensor similar to the one explained in FIG. 1.

In the stud gun type in this embodiment, the power point where the pressing force is generated and the power point of the electrode are positioned coaxially or in the vicinity of each other, and the strain amount generated is made very small because a longitudinal gun arm is not provided. Meanwhile, regarding the mounting easiness of the sensor, since the gun structure is connected to the electrode via the electrode holder 36 in the stud gun type, the pressing force detector 17 can easily be mounted. Therefore, it is preferably that the pressing force detector 17 is used in this stud gun type.

A welding gun 40 of the x gun type shown in FIG. 16 is mounted to a joint 41f of a robot with 6 degrees of freedom via a supporting portion (not shown), the robot comprising arms 45a to 45d and joints 41a to 41f (incidentally, such a structure may be employed that an arm is provided to the joint 41f and the supporting portion is provided to this arm). A servo motor 48 (hereinafter, simply referred to as motor) serving as electrode driving means and an encoder (not shown) serving as driving portion moving amount detecting means are provided to the supporting portion (not shown). A pair of gun arms 41 and 41 are provided on an output portion of the motor 48, and the pair of gun arms 41 and 41 are driven so as to open/close. Since these technique are known, explanation and illustration thereof will be omitted. Also, movable side electrodes 12 and 12 are respectively provided on tip end portions of the pair of gun arms 41 and 41 of the welding gun 40, and the movable side electrodes 12 and 12 sandwiches the member to be welded 1 to apply a predetermined pressing force thereon by closing the pair of gun arms 41.

Incidentally, as the welding gun 30 is connected to a control device 20 (not shown) in the same manner as the above-mentioned embodiments, explanation will be omitted.

In this embodiment, especially, strain amount detectors 7 and 7 for detecting an amount of strain occurring when the predetermined pressing force is applied to the member to be welded are respectively provided on the pair of gun arms 41 and 41 provided with the movable electrodes 12 and 12.

Incidentally, the strain sensor (the strain amount detector 7) is constituted with a strain sensor similar to one which has been explained as the second embodiment shown in FIG. 8.

In the x gun type shown in this embodiment, since the gun arms 41 and 41 are provided on both the movable electrode sides and the distance between the power point where a pressing force is generated and the power point of the electrode is long, the strain amount generated at both the gun arms 41 and 41 becomes large. Meanwhile, regarding the mounting easiness of the sensor, in a case of utilizing pressing detectors, such a structure must be employed that they are incorporated into the gun arms 41 and 41 as their portions and they are applied directly with a pressing force, which results in a complicated mounting structure of the pressing detectors to the gun arms 41 and 41 which form current paths for welding current. On the other hand, in a case of utilizing strain amount detectors 7, such a structure can be employed that they are simply attached to side faces of the gun arms 41 and 41, so that the attachment of the strain amount detectors 7 is made easy. For this reason, it is preferably to use the stain amount detectors 7 in this type.

In the C gun type shown in FIGS. 1 and 8, as mentioned above, when the pressure sensor is mounted to the movable side electrode, the mounting work is made easy but the strain amount becomes very small, so that it is preferable to use a pressing force detector in a case that the sensor is provided on the movable side electrode.

On the other hand, since the fixed side electrode is provided on the long and largely curved gun arm 11, a large strain amount can be obtained with a small pressing force so that it is preferable to provide a strain amount detector in a case that a sensor is provided on the fixed side electrode. Also, since the strain amount detector is attached directly to the gun arm 11 to detect a strain amount, the degree of freedom of an attachment position is high, and attaching can be made easy and the apparatus is made simple.

The embodiment to which the present invention is applied has been described, but the present invention is not limited to the embodiment. In the above embodiment, for example, the welding apparatus which utilizes the servo motor as electrode driving means is shown, but an oil cylinder or an air cylinder may be used instead. In this case, as means for detecting a moving amount of the driving section of the electrode driving means, for example, a gauge for measuring forward/backward amount of a piston is used.

The entire contents of Japanese Patent Applications p2000-12202 (filed on Jan. 20, 2000) and P2001-5840 (filed on Jan. 15, 2001) are incorporated herein by reference.

Although the invention has been described above by reference to certain embodiments of the invention, the invention is not limited to each of the embodiments as described above paragraph. Therefore, modifications and variations of the embodiments descried above will occur to those skilled in the art, in light of the above teachings. The scope of the invention is defined with reference to the following claims.

What is claimed is:

1. An inter-welding electrode moving amount detecting method comprising the steps of:
   moving a driving section of electrode driving means having the driving section connected to at least one of a pair of electrodes provided to opposed end portions of a welding gun to move the pair of electrodes to a direction approaching to each other:
   detecting an inter-welding electrode moving amount that the pair of electrodes are moved to a direction separating from/approaching to each other due to expansion/contraction of a nugget when a member to be welded is pressed, electrified and welded by the pair of electrodes; and
   obtaining the inter-welding electrode moving amounts by adding a moving amount of the driving section to an electrode moving direction due to the expansion/contraction of the nugget during welding and a deflection amount of the welding gun due to a pressing force applied from the electrodes to the member to be welded.

2. The inter-welding electrode moving amount detecting method according to claim 1, wherein the deflection amount is obtained by multiplying a stiffness factor related to pressing force of the welding gun and the pressing force.

3. The inter-welding electrode moving amount detecting method according to claim 2, wherein the pressing force is detected by pressing force detecting means provided to the welding gun.

4. The inter-welding electrode moving amount detecting method according to claim 2, wherein the stiffness factor related to pressing force of the welding gun is calculated based on a relationship between at least two kinds of pressing forces and the moving amounts of the driving section to the electrode moving direction when the pair of electrodes are brought into close to each other and the pressing forces are generated.

5. The inter-welding electrode moving amount detecting method according to claim 1, wherein the deflection amount is obtained by multiplying a stiffness factor related to a strain amount of the welding gun and the strain amount of the welding gun.

6. The inter-welding electrode moving amount detecting method according to claim 5, wherein the strain amount is detected by strain amount detecting means provided to the welding gun.

7. The inter-welding electrode moving amount detecting method according to claim 5, wherein the stiffness factor related to strain amount of the welding gun is calculated based on a relationship between at least two kinds of strain amounts and the moving amounts of the driving section to the electrode moving direction when the pair of electrodes are brought into close to each other and the pressing forces are generated.

8. An inter-welding electrode moving amount detecting apparatus, comprising:
   a pair of electrodes mounted to opposed end portions of a welding gun;
   electrode driving means having a driving section connected to at least one of the pair of electrodes;
   driving section moving amount detecting means for detecting a moving amount of said driving section to an electrode moving direction due to expansion/contraction of a nugget during welding; and
   control means for adding the moving amount detected by said driving section moving amount detecting means and a deflection amount of said welding gun due to a pressing force applied from said electrodes to a member to be welded so as to obtain the inter-welding electrode moving amount,
   wherein said driving section is moved so that one of said electrodes is moved to a direction where the electrodes approach to each other, and when said member to be welded is pressed and electrified and welded by said pair of electrodes, the inter-welding electrode moving amount that said pair of electrodes are moved to a direction separating from/approaching to each other due to the expansion/contraction of the nugget is detected.

9. The inter-welding electrode moving amount detecting apparatus according to claim 8, further comprising:
   pressing force detecting means for detecting a pressing force applied from said electrodes to said member to be welded,
   wherein the deflection amount is obtained by multiplying a stiffness factor related to pressing force of said welding gun by the pressing force detected by said pressing force detecting means.

10. The inter-welding electrode moving amount detecting apparatus according to claim 8, further comprising:
    strain amount detecting means for detecting a strain amount applied to the welding gun when the pressing force is applied from said electrodes to said member to be welded,
    wherein the deflection amount is obtained by multiplying a stiffness factor related to strain amount of said welding gun by the strain amount detected by said strain amount detecting means.

* * * * *